Figure 1:
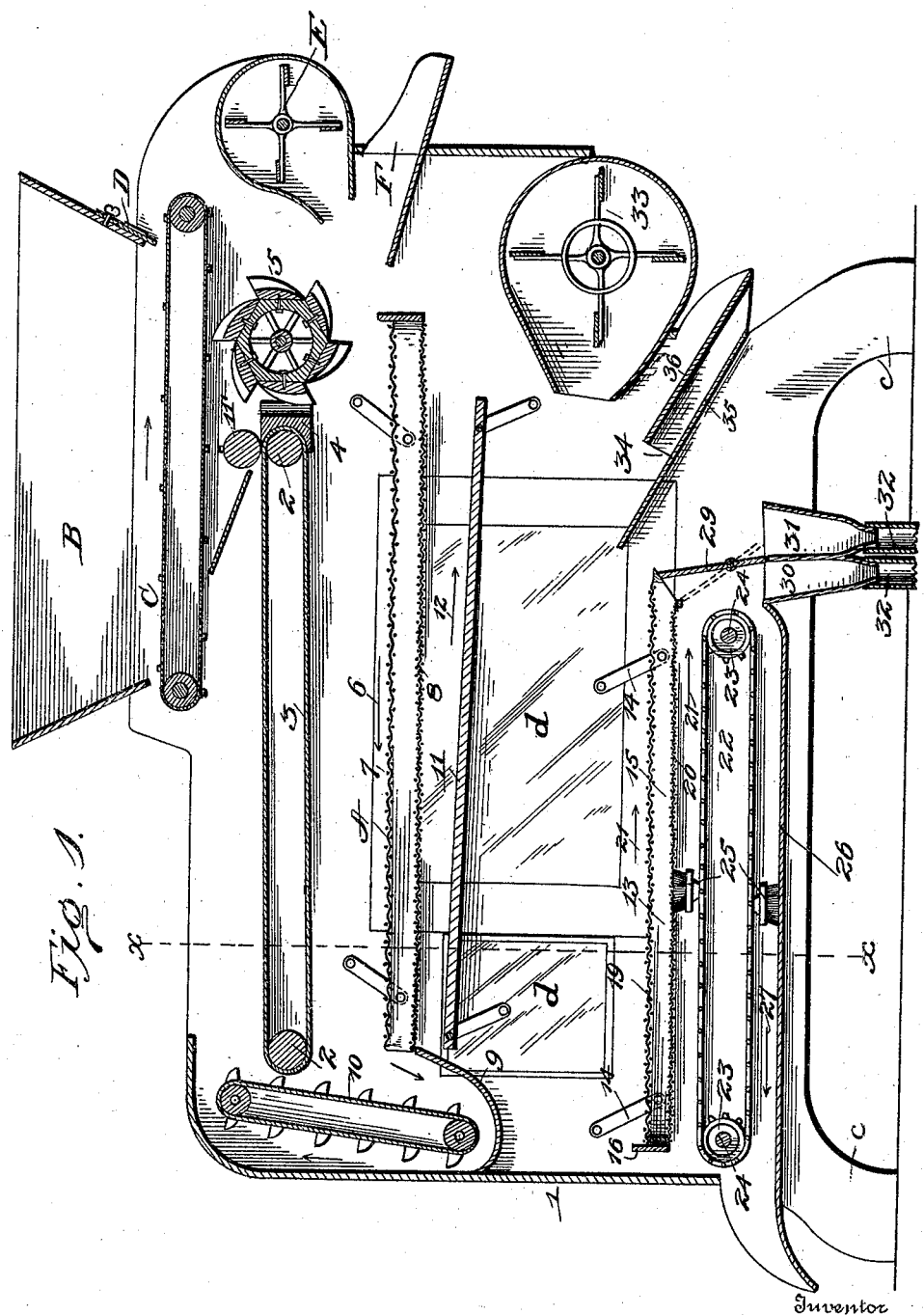

No. 635,076. Patented Oct. 17, 1899.
N. P. PERKINS.
MACHINE FOR GRANULATING TOBACCO.
(Application filed Sept. 29, 1898.)
(No Model.) 2 Sheets—Sheet 2.
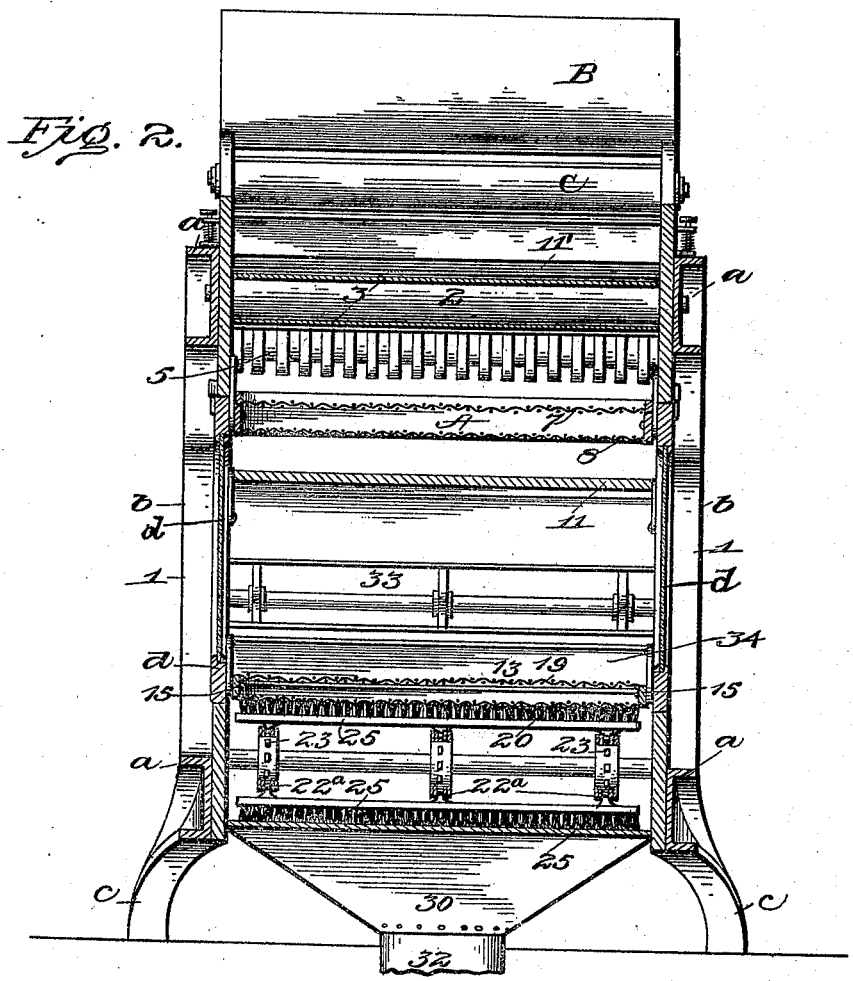
Fig. 2.
Fig. 3.
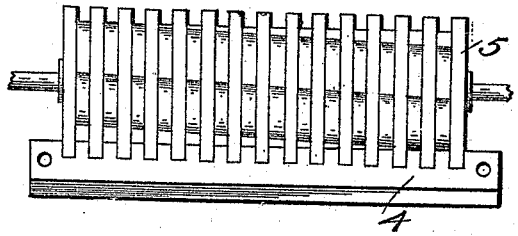
Witnesses
Inventor
Nicholas P. Perkins
by H. B. Willson & Co.
Attorneys
THE NORRIS PETERS CO., PHOTO-LITHO., WASHINGTON, D. C.

UNITED STATES PATENT OFFICE.

NICHOLAS P. PERKINS, OF ROANOKE, VIRGINIA, ASSIGNOR TO THE PERKINS MACHINE COMPANY, OF VIRGINIA.

MACHINE FOR GRANULATING TOBACCO.

SPECIFICATION forming part of Letters Patent No. 635,076, dated October 17, 1899.

Application filed September 29, 1898. Serial No. 692,241. (No model.)

*To all whom it may concern:*

Be it known that I, NICHOLAS P. PERKINS, a citizen of the United States, residing at Roanoke, in the county of Roanoke and State of Virginia, have invented certain new and useful Improvements in Machines for Granulating Tobacco; and I do declare the following to be a full, clear, and exact description of the invention, such as will enable others skilled in the art to which it appertains to make and use the same.

My invention relates to tobacco-cutting machines, and more particularly to that class of inventions for granulating smoking-tobacco.

The object of the invention is to improve the construction shown and described in Letters Patent No. 592,064, dated October 19, 1897. In that machine, after the tobacco and its inherent foreign matter pass and are acted upon by the cutting mechanism, the chopped mass falls upon a shaker, and in falling off the same is exposed to an air-blast, which blows the lighter grains of tobacco forwardly upon a separator and allows the heavier particles, such as the stems and foreign matter, to fall upon a deflecting-shaker, which is so arranged as to convey certain classes of particles away from the machine and allow other classes to be returned to the cutting mechanism. This construction and arrangement I have found by experience to be objectionable, for the reason that if the blast is regulated so as to blow only the lighter particles or grains of tobacco upon the separator heavier pieces of tobacco, such as grow close to the stems or such pieces that are imperfectly chopped by the cutting mechanism, would be conveyed from the machine with the stems or foreign matter, thus necessitating the re-feeding of the mass to the cutting mechanism or resulting in the loss of tobacco which might otherwise have been saved, and, on the other hand, if the blast were increased, so as to blow these heavier and imperfectly-chopped grains or pieces of tobacco upon the separator, the stems and foreign matter therein which correspond in weight thereto would also be blown upon the separator, which is very undesirable, for although the coarser grains of tobacco and the stems and foreign matter would be eventually conducted back to the cutting mechanism the smaller particles of foreign matter would be screened through the separators with the otherwise pure and graded tobacco.

Another object of my present invention is to improve the screening or separating mechanism. In the patent above referred to the grains of tobacco are swept through the sieves. This I have found breaks the grains or flakes and crumbles a large proportion of them into the form of dust, thus causing an unnecessary waste. In the present machine I effect a saving of tobacco by dispensing with the sweeping-brushes and in lieu thereof impart a vibratory motion to the separators or screens.

With these objects in view, as well as others which need not here be mentioned, the invention consists in certain features of construction and combination of parts, which will be hereinafter fully described and claimed.

In the accompanying drawings, in which I have illustrated the preferred embodiment of my invention, Figure 1 is a longitudinal sectional view of the machine. Fig. 2 is a cross-sectional view on the line X X of Fig. 1. Fig. 3 is a top plan view of the cutter-head and cutter-bar comprising the cutting mechanism.

In the drawings, 1 denotes the two supporting-standards, preferably rectangular in construction and each comprising the two horizontal pieces $a$ $a$, the two vertical pieces $b$ $b$, and the legs $c$ $c$. The front and the rear of the standards are boarded up, as are also the sides, which are provided with removable panels $d$ $d$ to afford convenient access to the interior of the frame. In the upper portion of the box-like frame thus constructed are journaled two shafts 2, that support an endless conveyer or apron 3. At the rear of the apron is the cutting mechanism, comprising the cutter-bar 4 and the coöperating cutter-head 5. A spring-actuated roller 11' is arranged above the rear shaft 2 and insures the delivery of the tobacco to the cutting mechanism in a smooth even mass. As all of these parts are shown and described in the patent hereinbefore referred to and in themselves form no part of the present invention, further description of the same will not be given except in connection with the description of the general operation of the machine. After the tobacco has been fed to the cutting mechanism by the apron 3 and is chopped into grains or flakes the mass falls upon a vibratory separator A, suspended from hangers pivoted to the sides of the frame, and the mass is thrust in the direction of the arrow 6. This separator consists of an open framework, to the upper face of which is secured a coarse screen 7 and to the lower face of which is secured a finer screen 8. Secured within the frame at its forward end and in advance of the forward end of the separator A is a pan 9, and working in this pan is a conveyer 10, preferably, but not necessarily, of the bucket type. This conveyer is designed to remove the contents of the pan 9 and discharge them upon the conveyer 3.

11 denotes a shaker-board located beneath the separator A and designed to receive the screened grains of tobacco and carry them rearwardly in the direction of the arrow 12. This shaker-board is supported upon pivoted hangers in the usual manner.

13 denotes a second vibratory separator suspended from hangers 14. This separator consists of the two side pieces 15, the forward end piece 16, and the screens 19 and 20, the former of coarser mesh than the latter and both of finer mesh than the screens of the separator A. The action of this separator is to feed the mass of granulated tobacco in the direction of the arrow 21. The rear end of the screen 20 terminates short of the rear end of the screen 19, for a purpose hereinafter to appear.

22 denotes a brushing mechanism located beneath the separator 13 and consisting of three sprocket-chains 22ª, supported upon sprocket-wheels 23, keyed to shafts 24 and connected by transversely-extending brushes 25, which on their upper run loosen the dust from the meshes of the screen 20 and on their lower run sweep the fallen dust from the pan 26 at the bottom of the machine. The direction of movement of the brushes is indicated by the arrow 27.

29 denotes a valve pivoted below and at the rear end of the separator 13.

30 31 denote two discharge-hoppers having conducting-pipes 32 32, that project through the floor.

33 denotes blowers arranged at the rear end of the machine, below and at the rear of the shaker-board 11, and above and at the rear of the separator 13.

34 denotes a deflecting-chute, which is the same in construction and is designed for the same purpose as the "deflecting-shaker" shown in the patent hereinbefore referred to, with the exception that in the present case the device is stationary.

The operation of the machine is as follows: Leaves of the tobacco are placed upon the apron 3 and are fed thereby to the cutting mechanism. The granulated mass now falls upon the vibratory separator A, the coarser particles lodging upon the screen 7, and the finer passing therethrough and lodging upon the screen 8, and the dust and still finer particles of tobacco falling through the screen 8 upon the shaker-board 11. The mass caught and retained by the screens 7 and 8 is fed in the direction of the arrow 6 to the pan 9 and from thence is conveyed back to the cutting mechanism by the conveyer 10 and apron 3, where a complete and final granulation is effected. The mass which fell through the screens 7 and 8 upon the shaker-board 11 is composed of fine tobacco flakes, dust, grit, and the like, and as this mass is shaken off the rear end of the shaker-board 11 it falls into the air current or blast created by the blower, which is so regulated that the dust and flakes or grains of tobacco are separated from the stems, flint, and the like and are blown over upon the forward end of the separator 13, while the stems and foreign matter, being of greater specific gravity than the dust and tobacco grains, fall upon the deflecting-chute, the stems upon the lower board 35 of the chute, and the foreign matter, which is heavier than the stems, upon the upper board 36. Receptacles may be placed at the lower end of the chute—one to receive the stems and the other the grit, &c. The mass of tobacco and dust separated from the grit and stems and blown over upon the separator 13 is now fed in the direction of the arrow 21, the finer particles of tobacco and dust falling through the screen 19 upon the screen 20 and the dust falling through the screen 20 into the pan 26, from which it is removed by the lower run of the brushes 25.

If it is desired to keep the tobacco upon the screen 19, which is of the "first grade," separate from the tobacco upon the screen 20, which is the "second grade," the valve 29 is moved to the position shown in full lines in Fig. 1, thus allowing the tobacco from the screen 19 to fall into the hopper 31 and the tobacco from the screen 20 to fall into the hopper 30, both of which lead to a room below. If, however, it is desired to mix the tobacco, the valve is moved to the position shown in dotted lines, thus allowing the tobacco to discharge into the hopper 31.

To adapt my machine for the granulation of "scrap-tobacco," I place a hopper B upon the top of the machine over the cutting mechanism and mount below the said hopper an endless carrier-belt C, which forms the bottom of said hopper. The scrap is emptied into the hopper and is carried by the belt C under the edge of the adjustable board D, which regulates the feed of tobacco. Arranged at the rear end of the machine and below and at the rear of the carrier-belt C is a blower E and below the blower and under the discharge end of the carrier-belt C an inclined chute F.

The operation of the device when used for granulating scrap-tobacco is as follows: The scrap-pieces are placed in the hopper B and are fed by the endless belt C rearwardly and dropped down behind the cutting mechanism and within the blast created by the blower E. The heavier particles—such as stems, flint, and foreign matter in general, being much heavier than the tobacco particles—fall into the inclined chute F and are conducted away from the machine, while the lighter particles of tobacco are blown upon the separator A. Those particles small enough to go through the meshes of the screens of the separator fall upon the shaker-board 11 and are operated upon in the manner hereinbefore described, while the coarser particles are led off and emptied into the pan 9 and from this point conducted to the cutting mechanism by the conveyer 10 and apron 3, and this operation continues until all of the stems, grit, and foreign matter have been separated and the tobacco led from the machine in commercial form.

It is of course understood that when I granulate first-class tobacco—that is, the leaves—the blower E and apron C are thrown out of gear with the driving mechanism of the machine. The hopper B is removed, thus permitting of the apron C to be used as a table upon which the bunches and leaves of tobacco are placed by the assistant within easy reach of the operator who feeds at the forward end of the machine.

The directions of movement of the several parts, as well as the direction of movement of the tobacco in its passage through the machine, are illustrated by arrows, and any well-known or approved system of gearing may be employed for transmitting movement from any suitable source of power to said parts; but as the same forms no part of my invention I do not deem it necessary either to illustrate or describe it.

What I claim is—

1. In a tobacco-cutter, the combination with the main frame, of a cutting mechanism, a vibratory separator located below said cutting mechanism, a second vibratory separator arranged below the first-named separator, a deflecting-chute arranged at the rear end of the machine, at the rear of the second-named vibratory separator and below the rear end of the first-named vibratory separator, a shaker-board located between the two separators and adapted to discharge the material at a point above the chute and a blower arranged at the rear of the deflecting-chute and under the rear end of the first-named vibratory separator, substantially as set forth.

2. In a tobacco-cutter, the combination with the main frame, of a cutting mechanism, a vibratory separator located below said cutting mechanism, a pan or receptacle located at the forward or discharge end of said vibratory separator, a conveyer for removing the contents of said pan or receptacle, a second conveyer for receiving the discharge from the first conveyer and conducting it back to the cutting mechanism, a shaker-board arranged below the vibratory separator, a second vibratory separator arranged below the shaker-board, a deflecting-chute arranged below the shaker-board and at the rear of the second-named vibratory separator, and a blower arranged below and at the rear of the shaker-board and at the rear of the deflecting-chute, substantially as shown and described.

3. In a tobacco-cutter, the combination with the main frame, of a cutting mechanism, a vibratory separator located below said cutting mechanism and consisting of two screens, the upper one of which is coarser than the lower one, a pan or receptacle located at the forward or discharge end of said vibratory separator, a conveyer for removing the contents of said pan or receptacle, a second conveyer for receiving the discharge from the first conveyer and conducting it back to the cutting mechanism, a shaker-board arranged below the vibratory separator, a second vibratory separator arranged below the shaker-board and consisting of two screens, the upper one of which is coarser than the lower one, said screens being of finer mesh than the screens of the first-named separator, substantially as set forth.

4. In a tobacco-cutter, the combination with the main frame, of a cutting mechanism, and the upper separating mechanism, of the lower separating mechanism arranged below the upper separating mechanism, the lower separating mechanism consisting of a vibratory upper and lower screen, the former of larger mesh than the latter, and the latter terminating short of the rear end of the former, brushing mechanism located below the lower screen, a pan located below the brushing mechanism, a valve arranged at the discharge end of the screens and adapted to either direct the combined contents of the two screens into one receptacle, or separate the contents and direct them into separate receptacles, a deflecting-chute arranged at the rear end of the lower separating mechanism and below the rear end of the upper separating mechanism, and a blower arranged at the rear of the deflecting-chute and below the rear end of the upper separating mechanism, substantially as set forth.

In testimony whereof I have hereunto set my hand in presence of two subscribing witnesses.

NICHOLAS P. PERKINS.

Witnesses:
BENJ. G. COWL,
W. S. HAUER.